(12) United States Patent
Steinman et al.

(10) Patent No.: US 9,043,625 B2
(45) Date of Patent: May 26, 2015

(54) PROCESSOR BRIDGE POWER MANAGEMENT

(75) Inventors: Maurice B. Steinman, Marlborough, MA (US); Alexander J. Branover, Chestnut Hill, MA (US); Denis J. Foley, Shrewsbury, MA (US); Ljubisa Bajic, Toronto (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 511 days.

(21) Appl. No.: 13/446,030

(22) Filed: Apr. 13, 2012

(65) Prior Publication Data
US 2013/0275778 A1 Oct. 17, 2013

(51) Int. Cl.
*G06F 1/32* (2006.01)
*G06F 1/00* (2006.01)

(52) U.S. Cl.
CPC ............ *G06F 1/3253* (2013.01); *G06F 1/3296* (2013.01); *Y02B 60/1235* (2013.01); *Y02B 60/1285* (2013.01)

(58) Field of Classification Search
CPC ..... G06F 1/324; G06F 1/3203; G06F 1/3296; Y02B 60/1217; Y02B 60/1285; Y02B 60/1278
USPC .......... 713/300, 320, 321, 322, 324; 710/306
See application file for complete search history.

(56) References Cited

U.S. PATENT DOCUMENTS

| | | | | |
|---|---|---|---|---|
| 6,243,817 | B1 * | 6/2001 | Melo et al. | 713/300 |
| 7,487,371 | B2 * | 2/2009 | Simeral et al. | 713/300 |
| 7,590,876 | B2 * | 9/2009 | Chu et al. | 713/322 |
| 7,610,497 | B2 * | 10/2009 | Lin et al. | 713/320 |
| 7,624,286 | B2 * | 11/2009 | Lin et al. | 713/300 |
| 7,783,905 | B2 * | 8/2010 | Chang et al. | 713/320 |
| 8,321,705 | B2 * | 11/2012 | Lakhanpal et al. | 713/322 |
| 8,732,495 | B2 * | 5/2014 | Hsiao et al. | 713/320 |
| 2006/0200573 | A1 * | 9/2006 | Lin | 709/231 |
| 2007/0288782 | A1 * | 12/2007 | Chang et al. | 713/323 |
| 2010/0162256 | A1 * | 6/2010 | Branover et al. | 718/104 |

* cited by examiner

*Primary Examiner* — Suresh Suryawanshi

(57) ABSTRACT

A power controller can set the power state of a processor bridge based on which processor modules are in a communicative state. In addition, for a power state where selected processor modules are expected to be non-communicative, the power controller can set the supplied voltage to have a reduced voltage guard band as compared to other power states. These power management techniques can reduce the power consumed by the processor.

20 Claims, 2 Drawing Sheets

PROCESSOR BRIDGE POWER MANAGEMENT

BACKGROUND

1. Field of the Disclosure

The present disclosure generally relates to processors and more particularly power management for processors.

2. Description of the Related Art

A processor typically employs a bridge that manages communications between processor modules, such as processor cores, engines (e.g. display and graphics engines), and a memory controller. The bridge handles routing and arbitration of transaction traffic, and can also manage other functions such as maintenance of memory coherency. The processor modules can interact with each other by communicating messages to the bridge, which ensures that the messages are transferred to their destinations in an orderly fashion based on various message characteristics, such as message priority, message size, and other factors.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
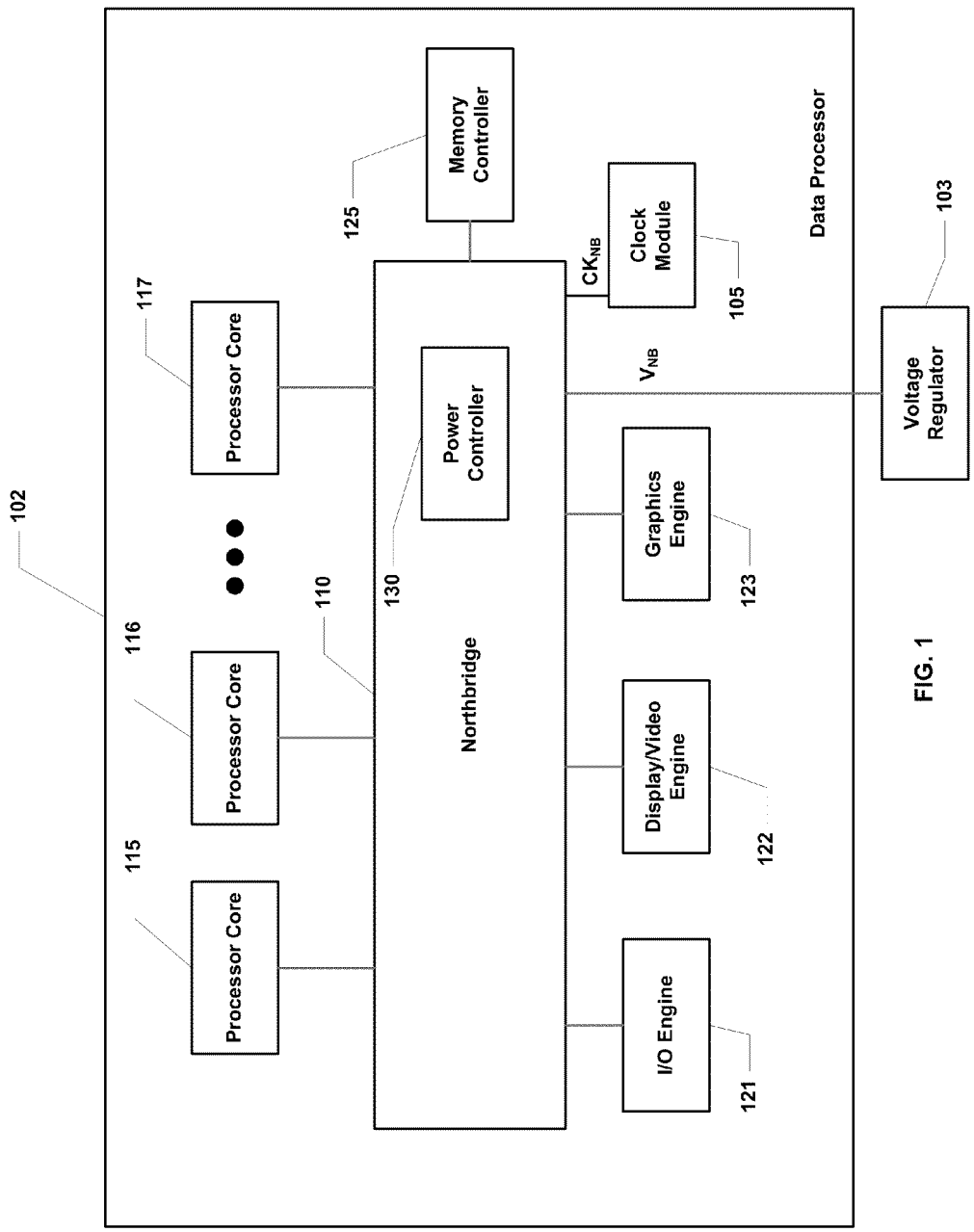
FIG. 1 is a block diagram of processor in accordance with one embodiment of the present disclosure.
Figure 2:
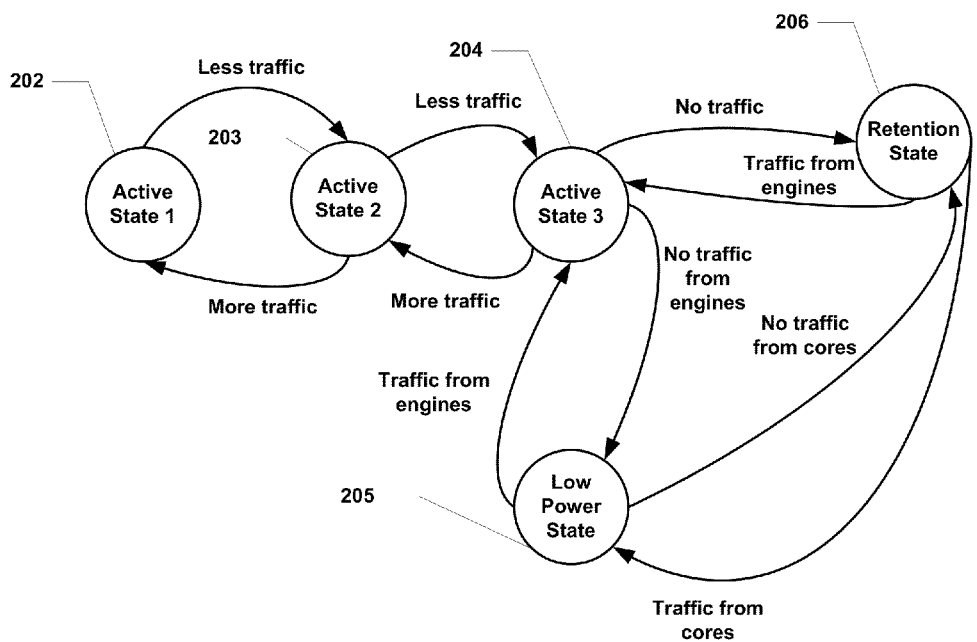
FIG. 2 is a state diagram illustrating the transition between different power states of the northbridge of FIG. 1 in accordance with one embodiment of the present disclosure.
Figure 3:
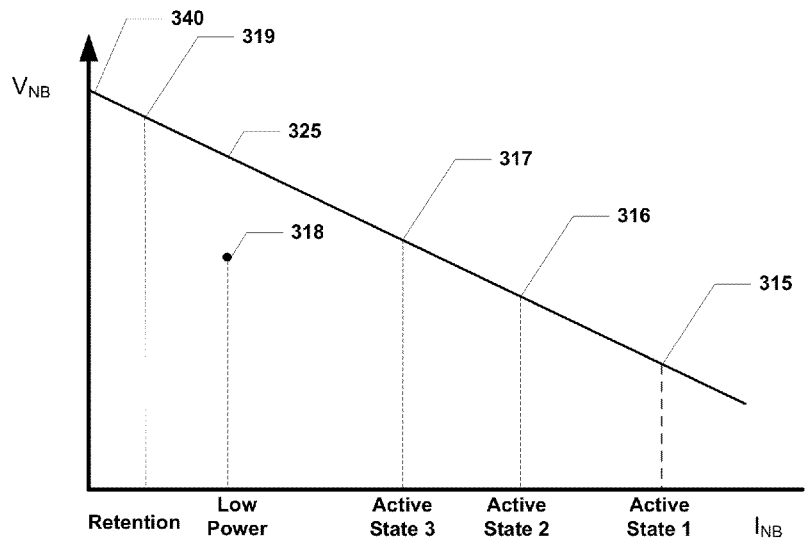
FIG. 3 is a diagram illustrating the voltage guard margin for different power states of the northbridge of FIG. 1 in accordance with one embodiment of the present disclosure.

FIGS. 1-3 illustrate techniques for managing the power supplied to a processor bridge based on the activity of modules connected to the bridge. In one embodiment, the functionality, behavior, and characteristics of the bridge can be classified into a set of power states, whereby the clock frequency for the bridge, and corresponding supplied voltage, is determined based on the power state. The clock frequency and corresponding supplied voltage determines, at least in part, the volume of transaction traffic that the bridge can process in a timely fashion in the corresponding power state. Further, some modules of the processor are typically associated with a higher volume of transaction traffic. Accordingly, a power controller at the bridge can set the power state of the bridge based on which processor modules are in a communicative state. In addition, for a power state where selected processor modules are expected to be non-communicative, the power controller can set the supplied voltage to have a reduced voltage guard band as compared to other power states. These power management techniques can reduce the power consumed by the processor.

FIG. 1 illustrates a processor 102 having a bridge (northbridge 110) having a controllable power state in accordance with one embodiment of the present disclosure. The processor 102 is connected to a voltage regulator 103 that provides a controllable amount of power, in the form of a controllable and regulated voltage, to one or more of the processor modules, including the northbridge 110. In at least one embodiment, the processor 102 is implemented as an integrated circuit package, such as, for example, a microprocessor, a microcontroller, an application specific integrated circuit (ASIC), and the like.

In the example of FIG. 1, the processor 102 includes processor cores (illustrated as processor cores 115-117), the northbridge 110, a clock module 105, and a set of processor resources with which the processor cores interact, including an input/output engine 121, a display/video engine 122, a graphics engine 123, and a memory controller 125, to execute designated device functions. The northbridge 110 facilitates interaction among the processor cores and the processor resources by managing the communication of messages between them, as described further herein.

The processor cores 115-117 each include an instruction pipeline to execute instructions, wherein the instruction pipeline can include instruction fetch logic, instruction decode logic, dispatch logic, one or more arithmetic logic units (ALUs), one or more floating point units (FPUs), and the like. In the course of executing instructions, the processor cores 115-117 can each generate communications, referred to as messages, for other cores and processor resources. Exemplary messages can include memory access requests (e.g. read and write requests), cache probes, resource task requests (e.g. a request that a resource perform a designated task) and the like. The processor cores 115-117 can also receive messages originated at other cores or processor resources, such as responses to memory access requests, cache probes or responses thereto, and the like.

The processor resources are generally configured to execute tasks in response to resource task requests or other messages generated at one of the processor cores 115-117. In the course of executing these tasks, the processor resources can generate messages for communication to the processor cores 115-117 and to other processor resources. A processor resource or processor core that is not expected to generate or receive a message from a processor core or other resource for a designated period of time is referred to as being in an idle state. A processor resource that is expected to generate or receive a message within the designated period of time is referred to as being in a non-idle state. In one embodiment, the idle state of a processor resource is coincident with a reduced power or reduced operating state of the resource.

The I/O engine 121 is a resource in the form of a module configured to provide an interface for the processor 102 to one or more peripheral input/output devices (not shown), such as a keyboard, computer mouse, touchpad, printer, external communication network, and the like. For example, in one embodiment, the I/O engine 121 provide a physical layer interface for a variety of interface types, including a peripheral component interconnect-express (PCIE) interface, a universal serial bus (USB) interface, an Ethernet or other network interface, and the like. The I/O engine 121 generally executes tasks, in response to received messages, to transfer data to and from the peripheral I/O devices. In conjunction with these tasks, the I/O engine 121 can generate messages to perform a variety of functions, including data storage, reporting of device status, error indications, and the like.

The display/video engine 122 is a processor resource in the form of a module that is configured to provide an interface to one or more display devices, such as computer monitors, video display screens, television sets, and the like. Accordingly, the display/video engine 122 can provide a physical layer interface in compliance with one or more display device standards, such as a high definition multimedia (HDMI) interface, a video graphics array (VGA) interface, a DisplayPort interface, and the like. The display/video engine 121 generally executes tasks, in response to received messages, to transfer frames of display data to the one or more display devices. In conjunction with these tasks, the display/video engine 121 can perform other operations, such as image decompression, rendering, filtering, and the like. The display/video engine 121 can also generate messages to perform a variety of operations, including status reporting, error reporting, and the like.

The graphics engine 123 is a processor resource in the form of a module that is configured to execute graphical operations, such as generation of frames suited for output to a display, in response to received messages. Accordingly, the graphics engine 123 can perform texture mapping, polygon rendering, geometric calculations such as rotations and translations of coordinates and polygons, shading, interpolation, matrix and vector operations, and other functions associated with frame generation. In the course of its operations, the graphics engine can generate a variety of messages to perform a number of operations, such as data storage and retrieval, status reporting, error reporting, and the like.

The memory controller 125 is a processor resource that manages communications to and from memory modules (not shown) external to the processor 102, such as random access memory (RAM) modules, flash memory modules, hard disk drives, and the like. Accordingly, the memory controller 125 can receive messages requesting memory access operations, such as read and write operations. In conjunction with responding to these messages, the memory controller can perform associated operations such as address translation, data retrieval and storage, and the like. The memory controller 125 can also perform memory maintenance functions, such as error detection and error correction, memory refresh management, and the like. The memory controller 125 can further generate messages responsive to received messages, such as messages to transfer data in response to a read operation. Other messages that can be generated by the memory controller 125 can include status messages, error messages, and the like.

The messages generated by the processor cores 115-117 and the processor resources, as described above, are generally referred to herein as transaction traffic. The northbridge 110 is a bridge device that manages the transaction traffic by controlling the flow of messages among the processor cores 115-117 and the processor resource. Accordingly, in an embodiment the northbridge 110 performs message buffering, message arbitration and message scheduling, message error detection, communication fabric switching, and other functions to ensure that messages are communicated according to a designated communication scheme.

As described further with respect to FIG. 2, the northbridge 110 is supplied with a controllable voltage, designated $V_{NB}$, and draws a current (designated $I_{NB}$) whose level is based in part upon the amount of transaction traffic being managed. In addition, the clock module 105 supplies a clock signal $CK_{NB}$ that the northbridge 110 employs to synchronize its operation. The speed with which the northbridge 110 is able to process transaction traffic is based on the frequency of $CK_{NB}$. In addition, in order for the northbridge 110 to process communication traffic properly, the voltage $V_{NB}$ supplied to the northbridge 110 must be set to a sufficient magnitude, which varies based on the frequency of $CK_{NB}$. Accordingly, the northbridge 110 includes a power controller 130 that is configured to control the frequency of $CK_{NB}$ and the magnitude of the voltage $V_{NB}$ based on 1) the amount of transaction traffic being managed at the northbridge 110, and 2) which processor cores and resources are in idle states. In the illustrated embodiment, the clock module 105 sets the frequency of $CK_{NB}$ responsive to control signaling from the power controller 130. Further, the voltage regulator sets the magnitude of $V_{NB}$ responsive to control signaling from the power controller 130.

To illustrate, it is typically desired that the northbridge 110 communicate messages at a defined minimum rate, referred to as the minimum communication rate. In an embodiment, the minimum communication rate is defined such that, if the message communication rate were to drop below the minimum communication rate by a specified tolerance amount, there would be a noticeable impact on the user experience, such as video frame skipping, delays in switching between applications, low video frame rates, and the like. As the volume of messages increase, the northbridge 110 will typically require a higher frequency of $CK_{NB}$ current in order to process the messages to meet the minimum communication rate. Further, as the frequency of $CK_{NB}$ increases, the northbridge 110 will need a commensurate increase in the voltage $V_{NB}$ in order to properly process the messages. Accordingly, as the number of messages being processed increases, the power controller 130 can alter the frequency of $CK_{NB}$, and correspondingly alter the voltage $V_{NB}$, to ensure that the northbridge 110 can operate at sufficient speed to satisfy the minimum communication rate. As the number of messages being processed decreases, the power controller 110 can frequency of $CK_{NB}$, and correspondingly alter the voltage $V_{NB}$, to save power while still satisfying the minimum communication rate.

In addition, some of the processor resources typically generate more messages than the processor cores 115-117, or generate messages in a less distributed fashion. For example, the graphics engine 123, in the course of executing its graphical functions, can quickly generate a high number of messages, as compared to the processor cores 115-117. Accordingly, for such resources, it can be useful to set the power state of the northbridge 110 such that the clock frequency and voltage lever to meet the minimum communication rate is available in the event the resources quickly generate a number of messages. The power controller 110 is therefore configured to set the power state of the northbridge 110 based on whether the engines 121-123 are providing transaction traffic. This can be better understood with reference to FIG. 2.

FIG. 2 illustrates a state diagram depicting power states 202-206 of the northbridge 110, whereby a different frequency of clock $CK_{NB}$ is provided by clock module 105, and a different magnitude of $V_{NB}$ is provided by the voltage regulator 103, to the northbridge 110 in each state. In the depicted example, states 202-204 each represent a different active state of the northbridge 110. In each of the active states, the northbridge 110 can concurrently process transaction traffic from all of the processor cores 115-117 and the engines 121-123 at a rate that satisfies the minimum communication rate. The state 205 represents a low power state, wherein the clock frequency and voltage supplied to the northbridge 110 is such that the northbridge 110 can only process transaction traffic among the processor cores 115-117, and cannot process transaction traffic among the engines 121-123 such that the northbridge 110 can satisfy the minimum communication rate. The state 206 represents a retention state, wherein the northbridge 110 can retain stored data, thereby maintaining the state of the northbridge 110 immediately prior to entering the state 206. However, in the state 206 the northbridge 110 is not able to process transaction traffic among any of the cores 115-117 and the engines 121-123 such that the northbridge 110 can satisfy the minimum communication rate.

In operation, for active states 202-204 at least one of the engines 121-123 is in a non-idle state. The processor cores 115-117 can be in either idle or non-idle states. The northbridge 110 transitions between the active states 202-204 based on the amount of transaction traffic to be processed. Thus, when the northbridge 110 is in state 202, a reduction in the amount of transaction traffic below a threshold level (designated for purposes of example Threshold 1) results in a transition to state 203. In state 203, an increase in the amount of transaction traffic above threshold 1 causes a transition to state 202. A reduction in the amount of transaction traffic below another threshold level (designated for purposes of example Threshold 2) results in a transition to state 204.

In state 204, an increase in transaction traffic above Threshold 2 causes a transition to state 203. An indication that none of the engines 121-123 are to provide or receive transaction traffic for a designated period of time, but that the processor cores 115-117 are to continue to generate transaction traffic, results a transition to state 205, the low power state. The indication can be provided by the engines 121-123, such as by one or more messages indicating that each of the engines is entering an idle state. The indication can also be provided by the power controller 110 by monitoring the transaction traffic associated with the engines 121-123 and determining that each of the engines is entering an idle state.

In addition, in state 204, in response to an indication that the processor cores 115-117 and the engines 121-123 are all in or about to enter idle states, such that they all will not be generating transaction traffic, the northbridge 110 transitions to the retention state 206. Accordingly, the northbridge 110 can be placed in different power states based on both the amount of traffic being generated and the particular modules of the processor 102 that are sending and receiving the transaction traffic.

In state 205, in response to determining that at least one of the engines 121-123 is exiting the idle state and is to begin sending or receiving transaction traffic, the northbridge 110 transitions to state 204. In response to determining, while in state 205, that the processor cores 115-117 are entering the idle state, the northbridge 110 transitions to the state 206. In state 206, in response to determining that at least one of the engines 121-123 is exiting the idle state and is to begin sending or receiving transaction traffic, the northbridge 110 transitions to state 204. In response to determining, while in state 205, that the processor cores 115-117 are exiting the idle state, but that the engines 121-123 will remain in idle states, the northbridge 110 transitions to the state 205.

FIG. 3 depicts a graph 300 illustrating the voltage magnitude supplied to the northbridge 110 in different states, in accordance with one embodiment of the present disclosure. The x-axis of the graph 300 shows the current, $I_{NB}$, which is also indicative of the amount of activity at the northbridge 110. The y-axis depicts the voltage $V_{NB}$ of the voltage for the northbridge 110 as set at the voltage regulator 103.

Different points represent the voltage magnitude and currents at different states of the northbridge 110. In particular, point 315 represents the $V_{NB}$ and $I_{NB}$ values for state 202, point 316 represents the values for state 203, point 317 represents the values for state 204, point 318 represents the values for state 205, and point 319 represents the values for state 206. In the illustrated embodiment, the voltage magnitude $V_{NB}$ increases and the current $I_{NB}$ decreases as the transaction traffic activity decreases. The voltage is increased in order to maintain a voltage guard margin. In particular, sudden increases or decreases in transaction traffic can cause step increases in the current $I_{NB}$, and commensurate short-term fluctuations in the voltage $V_{NB}$. By increasing the voltage $V_{NB}$ as transaction traffic decreases, a voltage guard margin is maintained so that the fluctuations are less likely to push the voltage $V_{NB}$ outside prescribed tolerances.

The points 315, 316, 317, and 319 define a load line 340. In the illustrated embodiment, the point 325 represents the point at which $V_{NB}$ would be set if, for state 205, it followed the linear relationship indicated by load line 340. However, for state 205 $V_{NB}$ is set to point 318, below point 325. This can be done because it is known in state 205 that the engines 121-123 are in the idle state, so that sudden fluctuations in $I_{NB}$ and $V_{NB}$ are less likely, or the magnitude of such fluctuations is likely to be reduced.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
setting a voltage supplied to a bridge of a processor such that a first point defined by a first voltage and corresponding first current associated with a first power state of the bridge has a non-linear relationship to a line defined by a second point and a third point, the second point defined by a second voltage and corresponding second current associated with a second power state of the bridge and the third point defined by a third voltage and corresponding third current associated with a third power state.

2. The method of claim 1, wherein the first voltage is lower than an expected voltage if the first point had a linear relationship with the second point and the third point.

3. The method of claim 1, wherein the second and third power states are states associated with the bridge communicating traffic from a first module of the processor and the first power state is a state associated with the bridge not communicating traffic from the first module.

4. The method of claim 3, wherein the first module comprises a graphics engine.

5. The method of claim 3, wherein the first module comprises a display engine.

6. The method of claim 3, wherein the first module comprises an input/output engine configured to provide an interface between the processor and an external device.

7. The method of claim 3, wherein the bridge receives transaction traffic from a second module of the processor while in any of the first, second, and third power states.

8. The method of claim 7, wherein the first module comprises a graphics engine and the second module comprises a processor core.

9. The method of claim 1, further comprising setting a power state of the bridge to one of the first, second, and third power states based on an amount of transaction traffic received at the bridge.

10. A method, comprising setting a frequency of a clock signal and setting a voltage supplied to a bridge of a processor based on an amount of transaction traffic received from a plurality of modules of the processor, such that the voltage supplied is set to a first magnitude in response to determining the bridge is to communicate traffic from a first and second module of the processor, and the voltage supplied is set to a second magnitude in response to determining the bridge is to communicate traffic from the first module but not to communicate traffic from the second module.

11. The method of claim 10, wherein the voltage supplied is set to the first magnitude in response to determining the bridge is to communicate traffic from at least one of the second module and a third module, and is set to the second magnitude in response to determining the bridge is to communicate traffic from the first module but not to communicate traffic from the second module nor from the third module.

12. The method of claim 10, wherein the first module comprises a processor core.

13. The method of claim 12, wherein the second module comprises a graphics engine.

14. The method of claim 12, wherein the second module comprises a display engine.

15. The method of claim 10, further comprising setting the voltage to a third magnitude in response to determining the bridge is not to communicate traffic from the first module and the second module.

16. A processor, comprising:
a processor core;
a processor engine;
a voltage regulator;
a bridge coupled to the processor core, the processor engine, and the voltage regulator, the bridge to set a voltage supplied to the bridge by the voltage regulator such that a first point defined by a first voltage and corresponding first current associated with a first power state of the bridge has a non-linear relationship to a line defined by a second point and a third point, the second point defined by a second voltage and corresponding second current associated with a second power state of the bridge and the third point defined by a third voltage and corresponding third current associated with a third power state of the bridge.

17. The processor of claim 16, wherein the first voltage is lower than an expected voltage if the first point had a linear relationship with the second point and the third point.

18. The processor of claim 16, wherein the second and third power states are states associated with the bridge communicating traffic from the processor engine and the first power state is a state associated with the bridge not communicating traffic from the processor engine.

19. The processor of claim 16, wherein the processor engine comprises a graphics engine.

20. The processor of claim 16, wherein the processor engine comprises a display engine.

* * * * *